United States Patent
Chen

(10) Patent No.: US 6,459,222 B1
(45) Date of Patent: Oct. 1, 2002

(54) BICYCLE CONTROL SYSTEM FOR CONTROLLING AN ELEBIKE

(75) Inventor: Ping-Ho Chen, Hsinchu (TW)

(73) Assignee: Chung Shan Institute of Science and Technology, Tao-Yuan Hsien (TW)

( * ) Notice: Subject to any disclaimer, the term of this patent is extended or adjusted under 35 U.S.C. 154(b) by 0 days.

(21) Appl. No.: 09/450,024

(22) Filed: Nov. 29, 1999

(51) Int. Cl.[7] .............................. H02P 1/04; B62K 11/00; B62M 7/00
(52) U.S. Cl. ........................ 318/430; 318/432; 318/434; 701/22; 474/70; 180/206
(58) Field of Search ................................ 318/430, 434, 318/432; 180/206, 207, 179, 220, 65.2, 65.8, 205; 123/350; 474/57, 70, 80, 103, 110, 116, 71, 160; 280/238, 261, 236, 260; 364/424.1; 701/22, 52, 57, 93

(56) References Cited

U.S. PATENT DOCUMENTS

| | | | | |
|---|---|---|---|---|
| 4,364,448 A | * | 12/1982 | Ikuma | 180/206 |
| 5,356,348 A | * | 10/1994 | Bellio et al. | 474/70 |
| 5,375,676 A | * | 12/1994 | Takata et al. | 180/206 |
| 5,570,752 A | * | 11/1996 | Takata | 180/206 |
| 5,681,234 A | * | 10/1997 | Ethington | 474/70 |
| 5,728,017 A | * | 3/1998 | Bellio et al. | 474/70 |
| 5,758,736 A | * | 6/1998 | Yamauchi | 180/220 |
| 5,845,727 A | * | 12/1998 | Miyazawa et al. | 180/205 |
| 5,922,035 A | * | 7/1999 | Chen | 701/22 |
| 6,015,159 A | * | 1/2000 | Matsuo | 280/238 |
| 6,125,959 A | * | 10/2000 | Seto et al. | 180/207 |

* cited by examiner

Primary Examiner—Paul Ip
(74) Attorney, Agent, or Firm—Winston Hsu

(57) ABSTRACT

An elebike comprises a bicycle frame, at least one wheel, a transmission mechanism installed for actuating the wheel, a pedal mechanism for transforming pedal forces into pedal torque and coupling the torque to the transmission mechanism to actuate the wheel, a servo motor comprising a control port used to generate a torque according to an input voltage inputted from the control port, a coupling device for coupling the servo motor torque to the transmission mechanism to actuate the wheel, and a power control handle for outputting a handle voltage according to the rider's inputs to control the torque outputted by the servo motor. The bicycle control system comprises a torque detector for detecting the pedal torque inputted by the rider and outputting a torque signal, a rotation rate detector for detecting the rotation rate of the wheel and outputting a rotation rate signal, a control circuit for processing the torque signal outputted by the torque detector and the rotation rate signal outputted by the rotation rate detector and outputting a motor control voltage, and a voltage coupling device for coupling the handle voltage outputted from the handle with the motor control voltage outputted from the control circuit in a predetermined manner and outputting a coupling voltage to control the servo motor.

14 Claims, 14 Drawing Sheets

| Fuzzy logic variable | Linguistic terms |
|---|---|
| $\Delta^2 \tau_{p,i}$ | PB、PM、PS、Z、NS、NM、NB |
| $\Delta^2 \Omega_i$ | PB、PM、PS、Z、NS、NM、NB |
| $\Delta V_i$ | PB、PM、PS、Z |
| $\Delta I_i$ | PB、PM、PS、Z、NS、NM、NB |

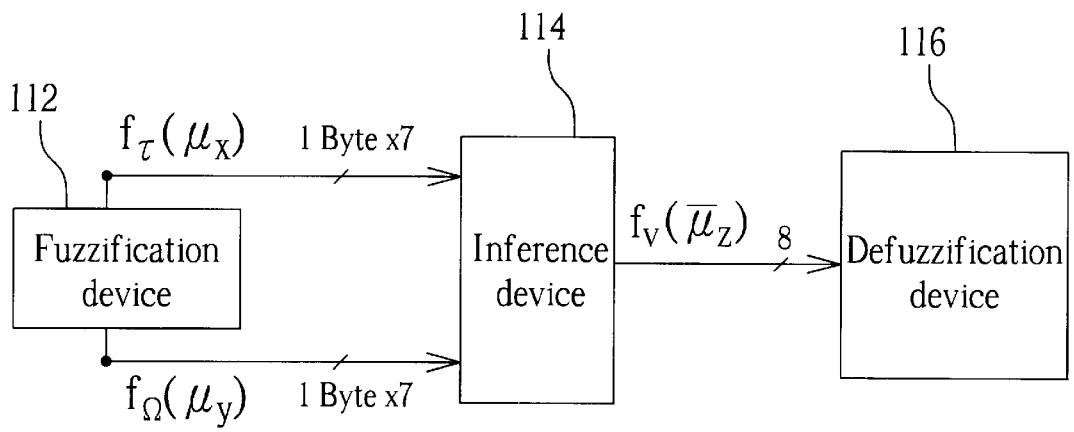
Fig. 15
Fig. 15a
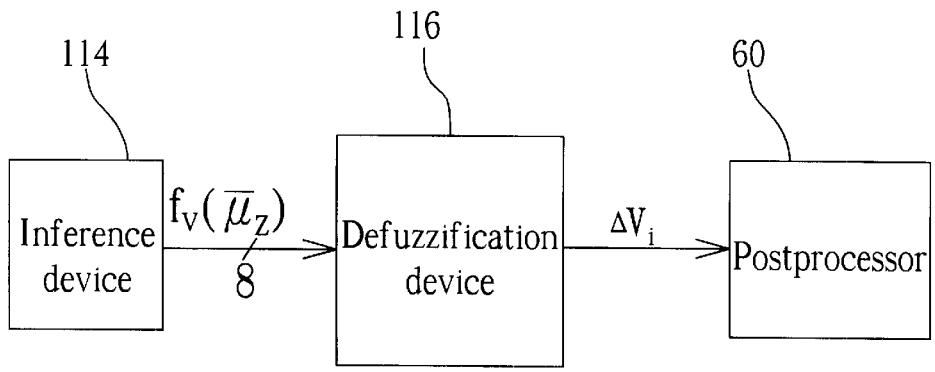
Fig. 16

BICYCLE CONTROL SYSTEM FOR CONTROLLING AN ELEBIKE

BACKGROUND OF THE INVENTION

1. Field of the Invention

The invention relates to a bicycle control system, and more particularly, to a bicycle control system for controlling an elebike (electrical power-aided bicycle) according to rider's inputs.

2. Description of the Prior Art

A rider can control an elebike by using electric power, physical exertion or both according to mood and road conditions.

Please refer to FIG. 1. FIG. 1 is a schematic diagram of a prior art elebike 10. The elebike 10 comprises a bicycle frame 12, two wheels 14, 15 rotatably installed on the frame 12, a gear wheel transmission module 16 installed on the frame 12 for actuating the wheel 15, a pedal mechanism 18 installed on the frame 12 for generating a pedal torque to actuate the gear wheel transmission module 16, a power control handle 20 installed on the frame 12 for outputting a handle voltage, a servo motor 22 installed on the frame 12 for outputting a torque according to the handle voltage, and a coupling device 24 for coupling the torque to the gear wheel transmission module 16 to actuate the wheel 15.

When the rider controls the elebike 10 by both pedaling and using electric power, the pedal mechanism 18 will generate a pedal torque to actuate the gear wheel transmission module 16 according to the mechanical power supplied by the rider. The power control handle 20 outputs a handle voltage according to the electric power requested by the rider, and the servo motor 22 outputs a torque according to the handle voltage. The coupling device 24 couples the torque to the gear wheel transmission module 16 to actuate the wheel 15.

The rider controls the prior art elebike 10 according to mood and road conditions. The rider manipulates the power control handle 20 to set a handle angle for outputting a handle voltage. The handle voltage is designed to be directly proportional to the handle angle. Because of this, the performance of the elebike 10 is unsatisfactory due to a jerkiness of motion. Furthermore, the electrical power aided to the rider on the elebike 10 is not well designed towards power optimization.

SUMMARY OF THE INVENTION

It is therefore a primary objective of the present invention to provide a bicycle control system for controlling an elebike.

Briefly, in a preferred embodiment, the present invention provides a bicycle control system for controlling an elebike (electrical power-aided bicycle) according to rider's inputs. The elebike comprises:

a bicycle frame;

at least one wheel rotatably installed on the frame;

a transmission mechanism installed on the frame for actuating the wheel;

a pedal mechanism installed on the frame for transforming pedal forces inputted by the rider into pedal torque and coupling the torque to the transmission mechanism to actuate the wheel;

a servo motor installed on the frame and comprising a control port, wherein the servo motor is used for outputting a torque according to an input voltage inputted from the control port;

a coupling device installed on the frame for coupling the torque outputted from the servo motor to the transmission mechanism to actuate the wheel; and a power control handle installed on the frame and connected the control port of the servo motor for outputting a handle voltage according to the rider's inputs to control the torque outputted by the servo motor.

The bicycle control system comprises:

a torque detector for detecting the pedal torque inputted by the rider and outputting a torque signal;

a rotation rate detector for detecting the rotation rate of the wheel and outputting a rotation rate signal;

a control circuit for processing the torque signal outputted by the torque detector and the rotation rate signal outputted by the rotation rate detector and outputting a motor control voltage; and a voltage coupling device connected with the handle, the output port of the control circuit and the control port of the servo motor for coupling the handle voltage outputted from the handle with the motor control voltage outputted from the control circuit in a predetermined manner and outputting a coupling voltage to control the servo motor.

It is an advantage of the present invention that the electrical power aided to the elebike is well designed towards power optimization.

These and other objectives and advantages of the present invention will no doubt become obvious to those of ordinary skill in the art after having read the following detailed description of the preferred embodiment that is illustrated in the various figures and drawings.

BRIEF DESCRIPTION OF THE DRAWINGS

FIG. 15 is a diagram of the inference device of the fuzzy logic controller in FIG. 13.

FIG. 15a is a table of the voltage output membership function of the inference device in FIG. 15.

FIG. 16 is a perspective diagram of the defuzzification device of the fuzzy logic controller in FIG. 13.

DETAILED DESCRIPTION OF THE PREFERRED EMBODIMENT

Figure 1:
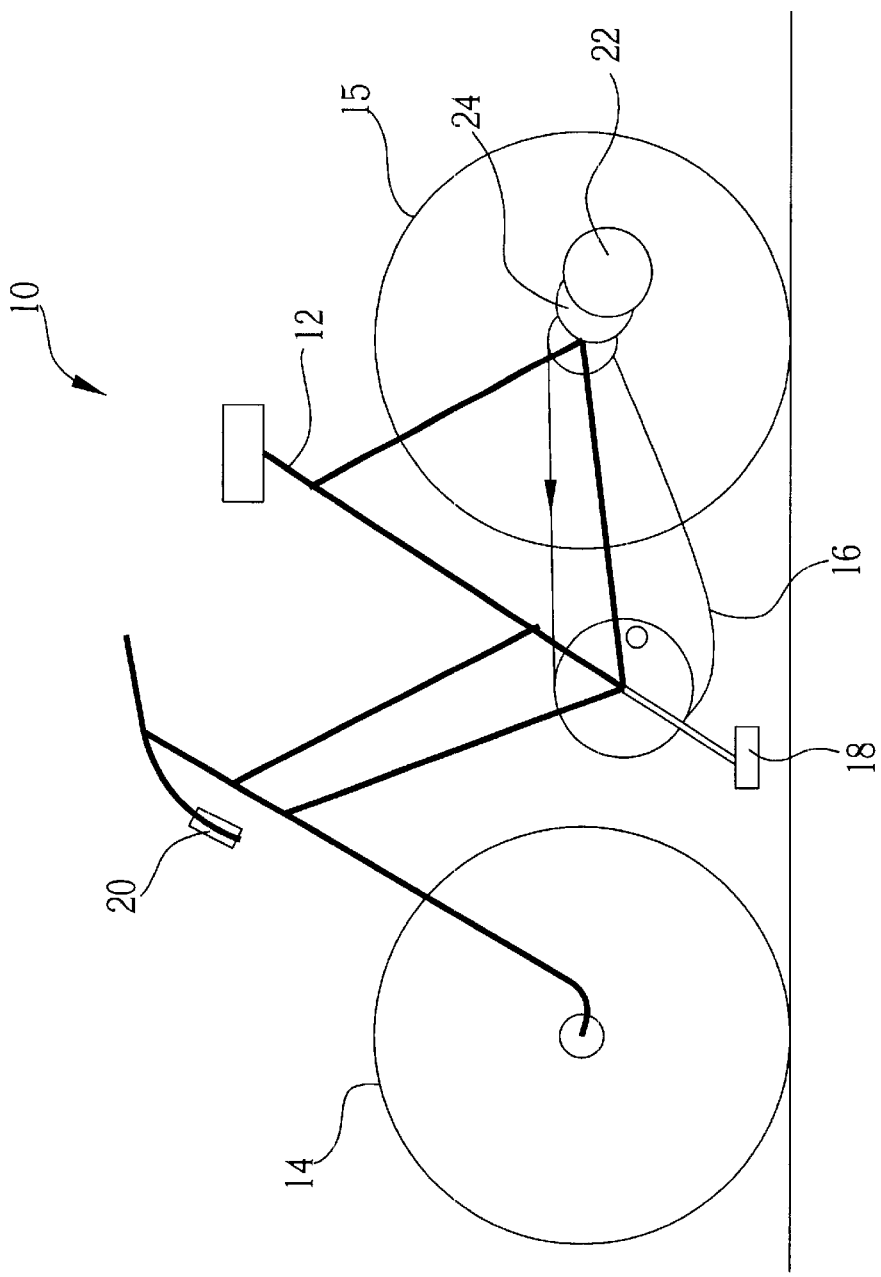
FIG. 1 is a perspective diagram of a prior art elebike.
Figure 2:
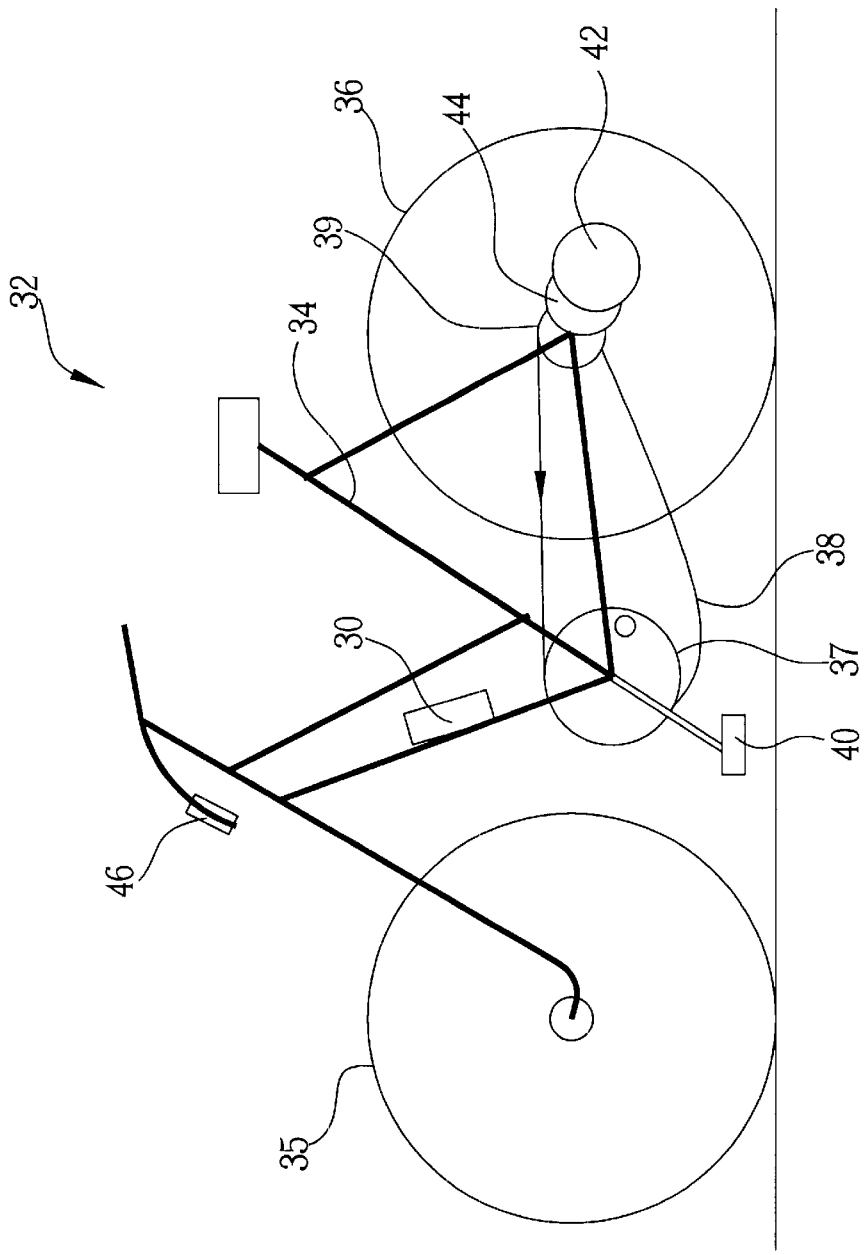
FIG. 2 is a perspective diagram of an elebike according to the present invention.
Figure 3:
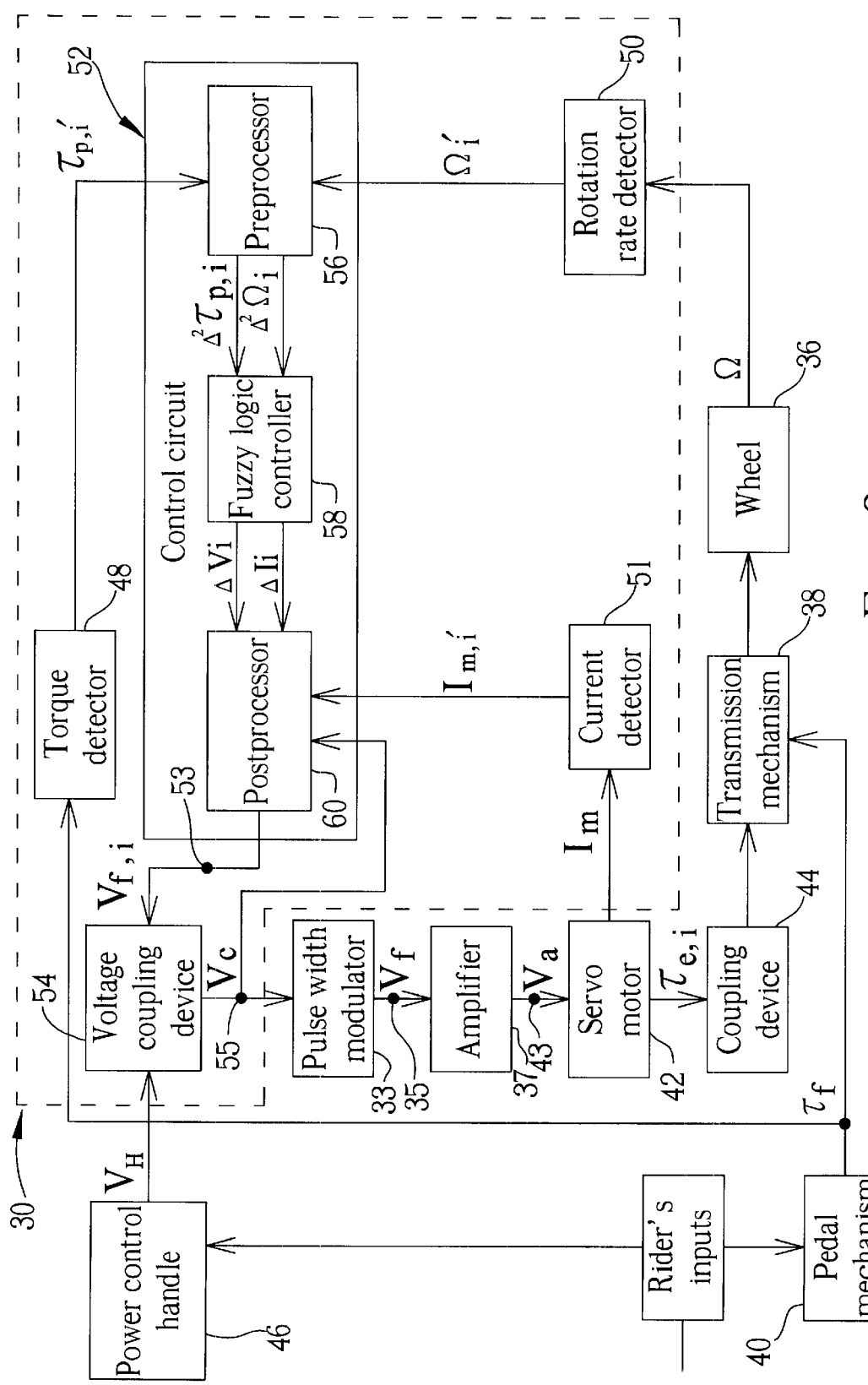
FIG. 3 is a functional block diagram of a bicycle control system according to the present invention.

Please refer to FIG. 2 and FIG. 3. FIG. 2 is a perspective diagram of an elebike 32 according to the present invention. FIG. 3 is a functional block diagram of a bicycle control system 30 according to the present invention. The present invention relates to a bicycle control system 30 for controlling an elebike 32 according to a rider's inputs. The elebike 32 comprises a bicycle frame 34, two wheels 35, 36, a transmission mechanism 38, a pedal mechanism 40, a servo motor 42, a coupling device 44, and a power control handle 46. The wheels 35, 36 are rotatably installed on the frame 34. The transmission mechanism 38 is installed on the frame 34 for actuating the wheel 36 and comprises a first gear wheel 37 and a second gear wheel 39. The pedal mechanism 40 is installed on the frame 34 for transforming pedal forces from the rider into pedal torque $\tau_f$ and coupling the torque $\tau_f$ to the transmission mechanism 38 to actuate the wheel 36. The servo motor 42 is installed on the frame 34 and comprises a control port 43 (FIG. 3). The servo motor 42 is used for outputting a torque $\tau_{e,i}$ according to an input voltage inputted from the control port 43. The coupling device 44 is installed on the frame 34 for coupling the torque $\tau_{e,i}$ outputted from the servo motor 42 to the transmission mechanism 38 to actuate the wheel 36. The power control handle 46 is installed on the frame 34 and is connected to the control port 43 of the servo motor 42 for outputting a handle voltage $V_H$ according to the rider's inputs to control the torque $\tau_{e,i}$ outputted by the servo motor 42.

The bicycle control system 30 comprises a torque detector 48, a rotation rate detector 50, a current detector 51, a control circuit 52, and a voltage coupling device 54. The torque detector 48 is used for detecting the pedal torque $\tau_f$ delivered by the rider and outputting a torque signal $\tau_{p,i}'$. The rotation rate detector 50 is used for detecting the rotation rate $\Omega$ of the wheel 36 and outputting a rotation rate signal $\Omega_i'$. The current detector 51 is used for detecting the current $I_m$ of the servo motor 42 and outputting a current $I_{m,i}'$. The control circuit 52 is used for processing the torque signal $\tau_{p,i}'$ outputted by the torque detector 48 and the rotation rate signal $\Omega_i'$ outputted by the rotation rate detector 50 and outputting a motor control voltage $V_{f,i}$. The voltage coupling device 54 is connected with the handle 46, the output port 53 of the control circuit 52 and the control port 43 of the servo motor 42 for coupling the handle voltage $V_H$ outputted from the handle 46 with the motor control voltage $V_{f,i}$ outputted from the control circuit 52 in a predetermined manner and outputting a coupling voltage $V_c$ to control the torque $\tau_{e,i}$ outputted by the servo motor 42.

The control circuit 52 comprises a preprocessor 56, a fuzzy logic controller 58, and a postprocessor 60. The preprocessor 56 is used for processing the torque signal $\tau_{p,i}'$ outputted from the torque detector 48 and rotation rate signal $\Omega_i'$ outputted from the rotation rate detector 50 and generating a torque fuzzy input variable $\Delta^2\tau_{p,i}$ and a rotation rate fuzzy input variable $\Delta^2\Omega_i$. The fuzzy logic controller 58 is used for transforming the torque fuzzy input variable $\Delta^2\tau_{p,i}$ and the rotation rate fuzzy input variable $\Delta^2\Omega_I$ into a motor voltage variable $\Delta V_i$ and a motor current variable $\Delta I_i$ according to a plurality of fuzzy logic rules. The postprocessor 60 is used for transforming the motor voltage variable $\Delta V_i$ and the motor current variable $\Delta I_i$ into a motor control voltage $V_{f,i}$.

Figure 4:
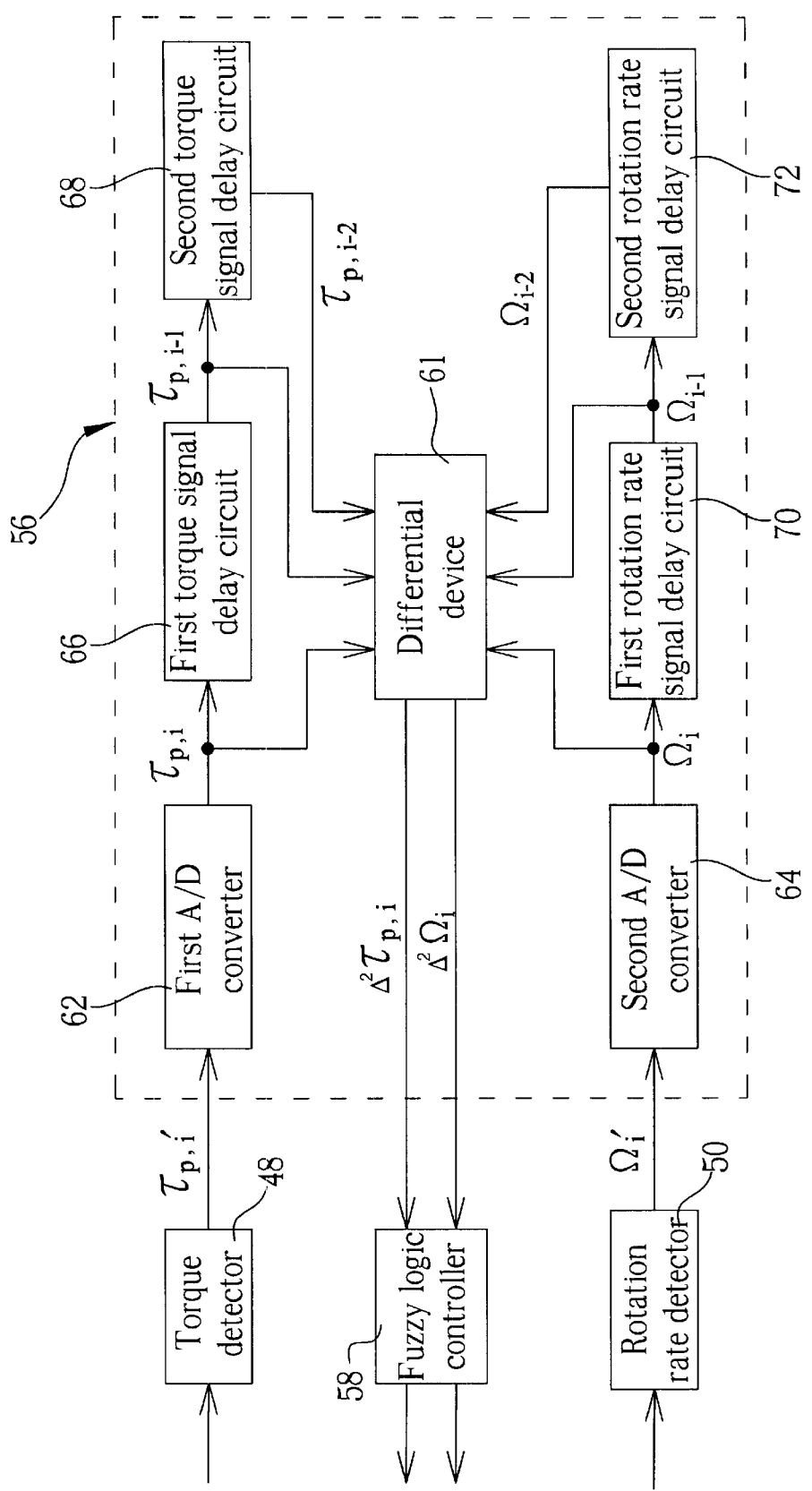
FIG. 4 is a functional block diagram of the preprocessor in FIG. 3.

Please refer to FIG. 4. FIG. 4 is a functional block diagram of the preprocessor 56 in FIG. 3. The preprocessor 56 comprises a first A/D (analog to digital) converter 62, a second A/D converter 64, a first torque signal delay circuit 66, a second torque signal delay circuit 68, a first rotation rate signal delay circuit 70, and a second rotation rate signal delay circuit 72. The first A/D converter 62 is used for transforming the torque signal $\tau_{p,i}'$ generated by the torque detector 48 into a digital torque signal $\tau_{p,i}$. The second A/D converter 64 is used for transforming the rotation rate signal $\Omega_i'$ outputted by the rotation rate detector 50 into a digital rotation rate signal $\Omega_i$. The first torque signal delay circuit 66 is connected to the first A/D converter 62 for delaying the digital torque signal $\tau_{p,i}$ for a time unit and generating a first torque delaying signal $\tau_{p,i-1}'$. The second torque signal delay circuit 68 is connected to the first torque signal delay circuit 66 for delaying the first torque delaying signal $\tau_{p,i-1}$ for a time unit and generating a second torque delaying signal $\tau_{p,i-2}$. The first rotation rate signal delay circuit 70 is connected to the second A/D converter 64 for delaying the digital rotation rate signal $\Omega_i$ for a time unit and generating a first rotation rate delaying signal $\Omega_{i-1}$. The second rotation rate signal delay circuit 72 is connected to the first rotation rate signal delay circuit 70 for delaying the first rotation rate delaying signal $\Omega_{i-1}$ for a time unit and generating a second rotation rate delaying signal $\Omega_{i-2}$.

The preprocessor 56 further comprises a differential device 61 connected to the first A/D converter 62, the second A/D converter 64, the first torque signal delay circuit 66, the second torque signal delay circuit 68, the first rotation rate signal delay circuit 70, and the second rotation rate signal delay circuit 72 for generating the torque fuzzy input variable $\Delta^2\tau_{p,i}$ and the rotation rate fuzzy input variable $\Delta^2\Omega_i$. The differential device 61 generates a first torque differential signal $\Delta\tau_{p,i}$ by computing the difference between the first torque delaying signal $\tau_{p,i-1}$ and the digital torque signal $\tau_{p,i}$ wherein $\Delta\tau_{p,i}=\tau_{p,i}-\tau_{p,i-1}$. It generates a second torque differential signal $\Delta\tau_{p,i-1}$ by computing the difference between the second torque delaying signal $\tau_{p,i-2}$ and the first torque delaying signal $\tau_{p,i-1}$, wherein $\Delta\tau_{p,i-1}=\tau_{p,i-1}-\tau_{p,i-2}$. It then generates the torque fuzzy input variable $\Delta^2\tau_{p,i}$ by computing the difference between the second torque differential signal $\Delta\tau_{p,i-1}$ and the first torque differential signal $\Delta\tau_{p,i}$ wherein $\Delta^2\tau_{p,i}=\Delta\tau_{p,i}-\Delta\tau_{p,i-1}$. Furthermore, the differential device 61 generates a first rotation rate differential signal $\Delta\Omega_i$ by computing the difference between the first rotation rate delaying signal $\Omega_{i-1}$ and the digital rotation rate signal $\Omega_i$ wherein $\Delta\Omega_i=\Omega_i-\Omega_{i-1}$. Similarly, it generates a second rotation rate differential signal $\Delta\Omega_{i-1}$ by computing the difference between the second rotation rate delaying signal $\Omega_{i-2}$ and the first rotation rate delaying signal $\Omega_{i-1}$ wherein $\Delta\Omega_{i-1}=\Omega_{i-2}$, and generates a rotation rate fuzzy input variable $\Delta^2\Omega_i$ by computing the difference between the second rotation rate differential signal $\Delta\Omega_{i-1}$ and the first rotation rate differential signal $\Delta\Omega_i$ wherein $\Delta\Omega^2_i=\Delta\Omega_i-\Delta\Omega_{i-1}$.

Figure 5:
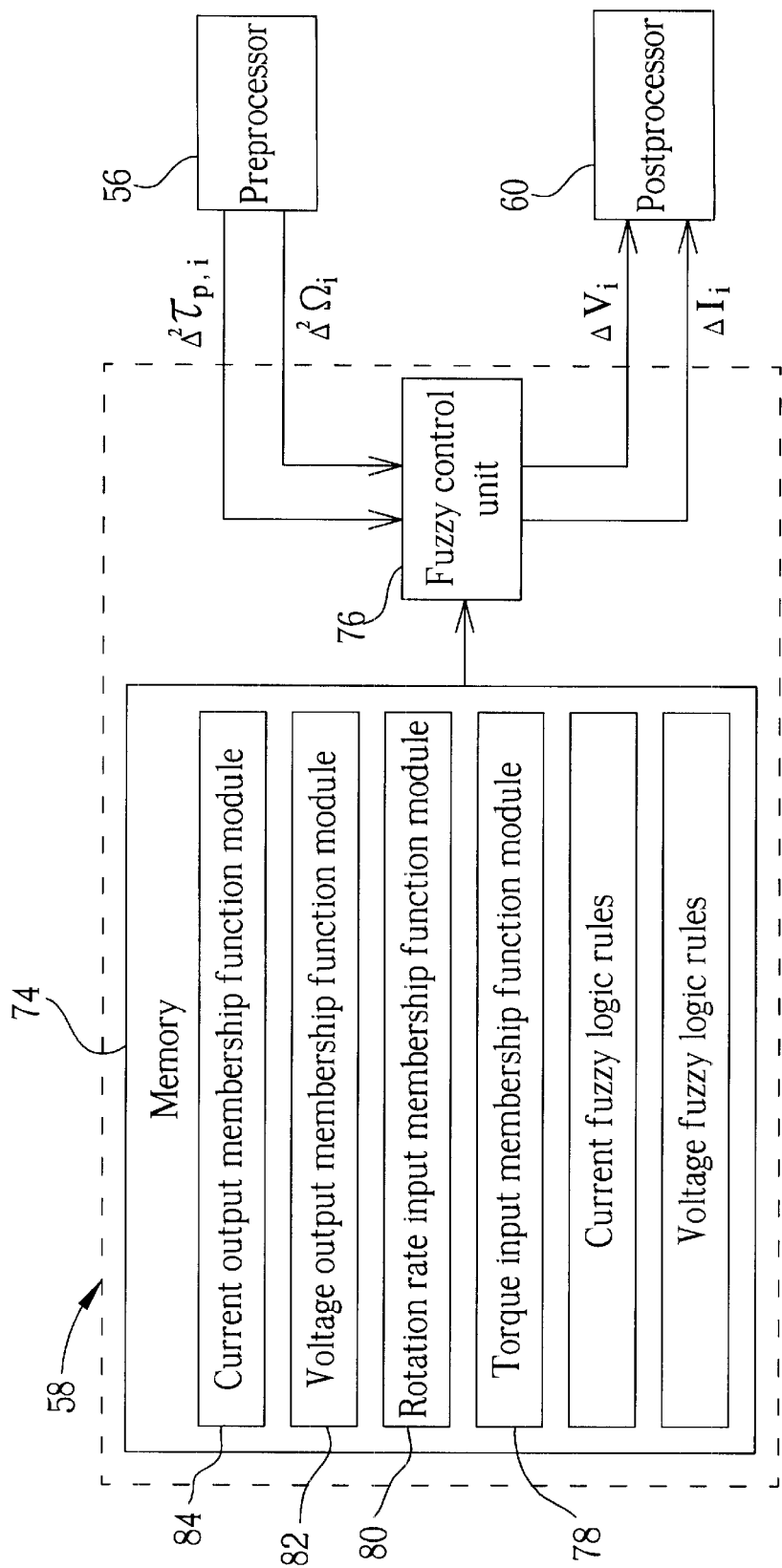
FIG. 5 is a functional block diagram of the fuzzy logic controller in FIG. 3.

Please refer to FIG. 5. FIG. 5 is a functional block diagram of the fuzzy logic controller 58 in FIG. 3. The fuzzy logic controller 58 comprises a memory 74, and a fuzzy control unit 76. The memory 74 is used for storing the fuzzy logic rules. The fuzzy control unit 76 is connected to the preprocessor 56 for transforming the torque and rotation rate fuzzy input variables $\Delta^2\tau_{p,i}$, $\Delta^2\Omega_i$ into the motor voltage variable $\Delta V_i$ and the motor current variable $\Delta I_i$ according to the fuzzy logic rules. The fuzzy logic rules include a plurality of voltage fuzzy logic rules and a plurality of current fuzzy logic rules. Each of the voltage fuzzy logic rules defines a relationship between the torque and rotation rate fuzzy input variables $\Delta^2\tau_{p,i}$, $\Delta^2\Omega_i$ and the motor voltage variable $\Delta V_i$. Each of the current fuzzy logic rules defines a relationship between the torque and rotation rate fuzzy input variables $\Delta^2\tau_{p,i}$, $\Delta^2\Omega_i$ and the motor current variable $\Delta I_i$.

The fuzzy logic controller 58 further comprises a torque input membership function module 78, a rotation rate input membership function module 80, a voltage output membership function module 82, and a current output membership function module 84. The torque input membership function module 78 is stored in the memory 74 and comprises a torque input membership function $\mu$ ($\Delta^2\tau_{p,i}$) for transforming the torque fuzzy input variable $\Delta^2\tau_{p,i}$ into a torque fuzzy value. The rotation rate input membership function module 80 is stored in the memory 74 and comprises a rotation rate input membership function $\mu$ ($\Delta^2\Omega_i$) for transforming the rotation rate fuzzy input variable $\Delta^2\Omega_i$ into a rotation rate fuzzy value. The voltage output membership function module 82 is stored in the memory 74 and comprises a voltage output membership function $\mu$ ($\Delta V_i$) for transforming the voltage fuzzy output variable $\Delta V_i$ into a voltage fuzzy value. The current output membership function module 84 is stored in the memory 74 and comprises a current output membership function $\mu$ ($\Delta I_i$) for transforming the current fuzzy output variable $\Delta I_i$ into a current fuzzy value.

Figure 6:
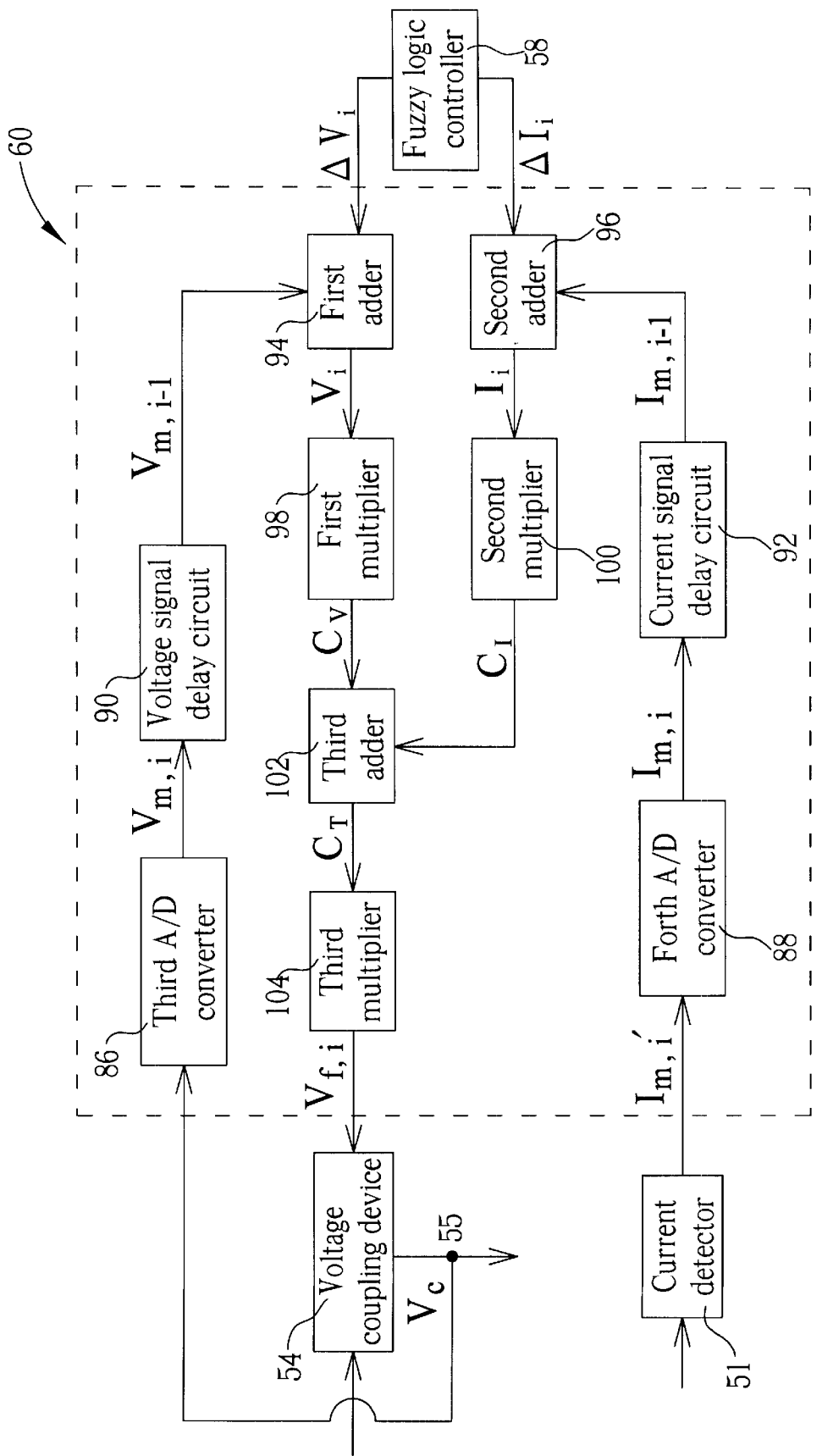
FIG. 6 is a functional block diagram of the postprocessor in FIG. 3.

Please refer to FIG. 6. FIG. 6 is a functional block diagram of the postprocessor 60 in FIG. 3. The postprocessor 60 comprises a third A/D converter 86, a fourth A/D converter 88, a voltage signal delay circuit 90, and a current signal delay circuit 92. The third A/D converter 86 is used for transforming the coupling voltage $V_c$ outputted by the voltage coupling device 54 into a digital voltage signal $V_{m,i}$. The fourth A/D converter 88 is used for transforming the current $I_{m,i}'$ outputted by the current detector 51 into a digital current signal $I_{m,i}$. The voltage signal delay circuit 90 is connected to the third A/D converter 86 for delaying the digital voltage signal $V_{m,i}$ for a time unit and generating a voltage delaying signal $V_{m,i-1}$. The current signal delay circuit 92 is connected to the fourth A/D converter 88 for delaying the digital current signal $I_{m,i}$ for a time unit and generating a current delaying signal $I_{m,i-1}$.

The postprocessor 60 further comprises a first adder 94, a second adder 96, a first multiplier 98, a second multiplier 100, a third adder 102, and a third multiplier 104. The first adder 94 is used for processing the voltage delaying signal $V_{m,i-1}$ and the motor voltage variable $\Delta V_i$ generated by the fuzzy logic controller 58 to generate an output voltage variable $V_i$. The second adder 96 is used for processing the current delaying signal $I_{m,i-1}$ and the motor current variable $\Delta I_i$ generated by the fuzzy logic controller 58 to generate an output current variable $I_i$. The first multiplier 98 is used for multiplying the output voltage variable $V_i$ generated by the first adder 94 by a predetermined voltage correcting value $(W_V/V_N)$ to generate a voltage correcting value $C_V$ wherein $C_V=W_V(V_i/V_N)$. $W_V$ represents a voltage weighting value and $V_N$ represents a normalized voltage. The second multiplier 100 is used for multiplying the output current variable $I_i$ generated by the second adder 96 by a predetermined current correcting value $(W_I/I_N)$ to generate a current correcting value $C_I$, wherein $C_I=W_I(I_i/I_N)$, $W_I$ represents a current weighting value and $I_N$ represents a normalized current. The third adder 102 is used for adding the voltage correcting value $C_V$ generated by the first multiplier 98 and the current correcting value $C_I$ generated by the second multiplier 100 to generate a sum correcting value $C_T$ wherein $C_T=W_V(V_i/V_N)+W_I(I_i/I_N)$. The third multiplier 104 is used for multiplying the sum correcting value $C_T$ generated by the third adder 102 by the predetermined voltage parameter $V_N$ to generate the motor control voltage $V_{f,i}$ wherein $V_{f,i}=[W_V(V_i/V_N)+W_I(I_i/I_N)]V_N$.

Figure 7:
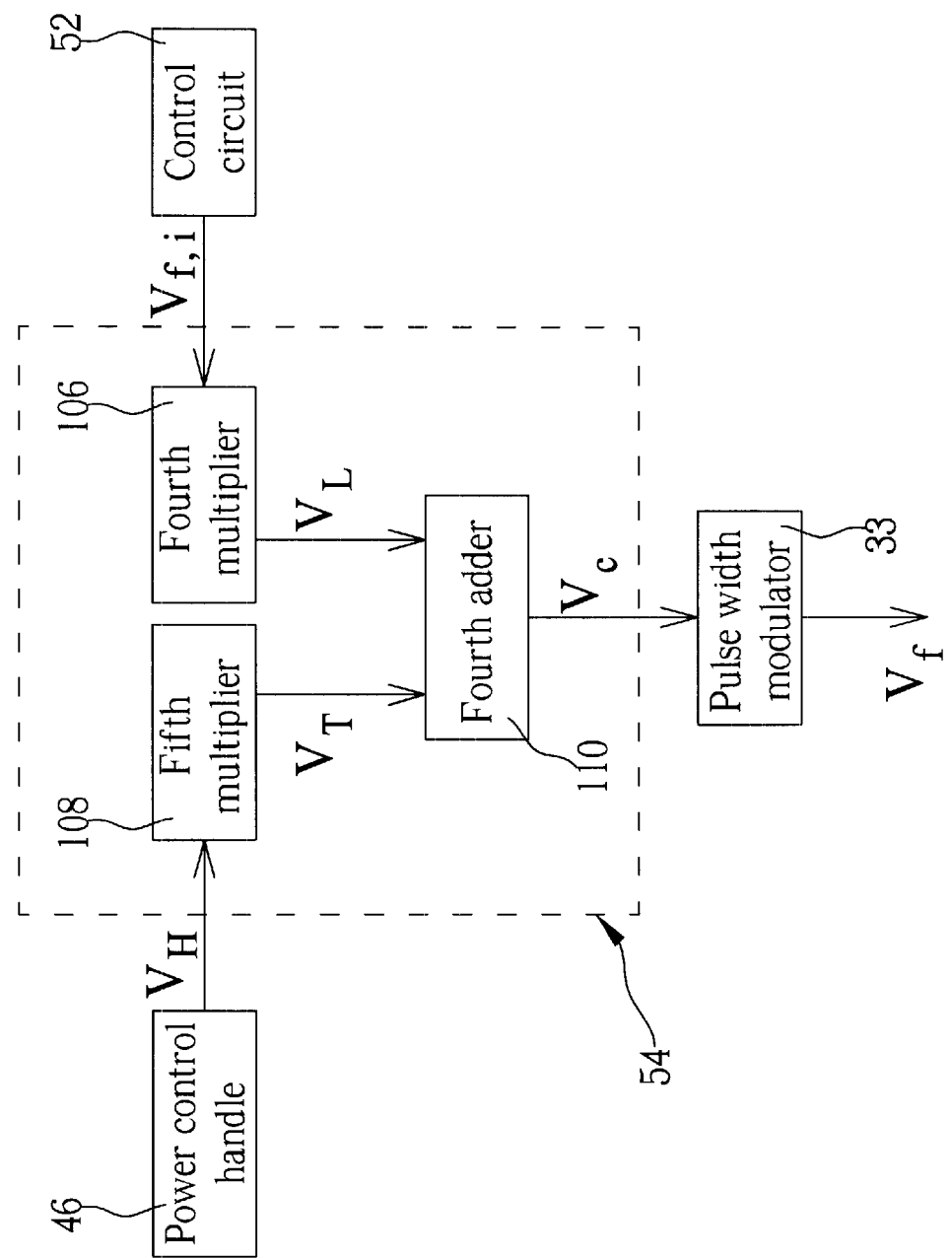
FIG. 7 is a functional block diagram of the voltage coupling device in FIG. 3.

Please refer to FIG. 7. FIG. 7 is a functional block diagram of the voltage coupling device 54 in FIG. 3. The voltage coupling device 54 comprises a fourth multiplier 106, a fifth multiplier 108, and a fourth adder 110. The fourth multiplier 106 is used for multiplying the motor control voltage $V_{f,i}$ outputted by the control circuit 52 by a predetermined first control parameter $S_L$ to generate a first motor control voltage $V_L$ wherein $V_L=S_L \times V_{f,i}$ '$0 \leq S_L \leq 1$. The fifth multiplier 108 is used for multiplying the handle voltage $V_H$ outputted by the handle 46 by a predetermined second control parameter $S_T$ to generate a second motor control voltage $V_T$ wherein $V_T=S_T \times V_H$ '$0 \leq S_T < 1$' and $S_L+S_T=1$. The fourth adder 110 is used for adding the first motor control voltage $V_L$ generated by the fourth multiplier 106 and the second motor control voltage $V_T$ generated by the fifth multiplier 108 to output the coupling voltage $V_c$ wherein $V_c=S_L \times V_{f,i}+S_T \times V_H$.

The first control parameter $S_L$ and second control parameter $S_T$ are designed according to the training or learning of the fuzzy logic controller 58 of the elebike 32. For the training of the fuzzy logic controller 58, the first control parameter $S_L$ is set to 0, and the second control parameter $S_T$ is set to 1. The coupling voltage $V_c$ is then controlled only by the handle voltage $V_H$. When the training of the fuzzy logic controller 58 is complete, the first control parameter $S_L$ is set to 1, and the second control parameter $S_T$ is set to 0. The coupling voltage $V_c$ is then controlled solely by the motor control voltage $V_{f,i}$. For the training of the fuzzy logic controller 58, the first control parameter $S_L$ and the second control parameter $S_T$ are set between 0 and 1.

Please refer to FIG. 3. The elebike 32 further comprises a pulse width modulator 33 connected to the output port 55 of the voltage coupling device 54 for modulating the pulse width of the coupling voltage $V_c$ and generating a pulse width voltage $V_f$. An amplifier 37 is connected between the output port 35 of the pulse width modulator 33 and the control port 43 of the servo motor 42 for amplifying the pulse width voltage $V_f$ and generating an amplified voltage $V_a$ to drive the servo motor 42 and control the torque $\tau_{e,i}$ generated by the servo motor 42.

When the rider controls the elebike 32 by physically supplying mechanical power as well as requesting electric power, the pedal mechanism 40 will generate a pedal torque $\tau_f$ to actuate the transmission mechanism 38 and actuate the wheel 36 of the elebike 32 and generate a rotation rate $\Omega$ according to the mechanical power supplied by the rider. The power control handle 46 outputs a handle voltage $V_H$ according to the electric power requested by the rider to drive the servo motor 42. The bicycle control system 30 generates the coupling voltage $V_c$ according to the pedal torque $\tau_f$ of the pedal mechanism 40, the rotation rate $\Omega$ of the wheel 36, the handle voltage $V_H$ of the power control handle 20 and the current $I_m$ of the servo motor 42. The pulse width modulator 33 then modulates the pulse width of the coupling voltage $V_c$ and generates a pulse width voltage $V_f$. The amplifier 37 amplifies the pulse width voltage $V_f$ and generates an amplified voltage $V_a$ to control the torque $\tau_{e,i}$ of the servo motor 42. Finally, the coupling device 44 couples the torque $\tau_{e,i}$ of the servo motor 42 to the transmission mechanism 38 to actuate the wheel 36 so as to control the electrical power aided to the rider on the elebike 32.

The control circuit 52 of the bicycle control system 30 uses fuzzy logic rules to control the electrical power of the elebike 32. The procedure for designing another fuzzy logic controller 59 (FIG. 13) incorporates the designs of fuzzy logic rules, the membership functions, and the fuzzy logic controller.

Design of Fuzzy Logic Rules

Figure 8:
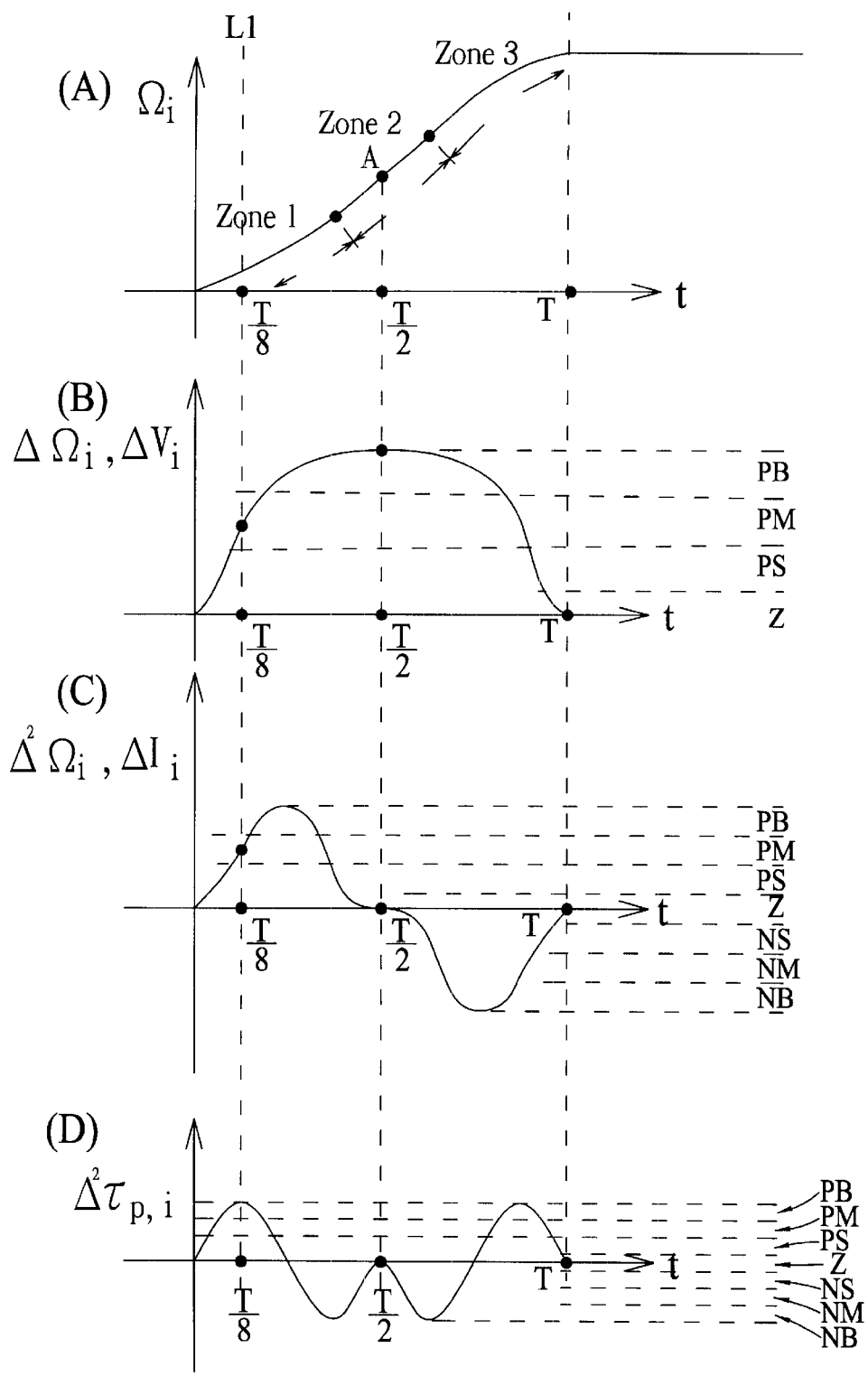
FIG. 8 shows the relationship of the digital rotation rate signal $\Omega_i$, the rotation rate differential signal $\Delta\Omega_i$ (the motor voltage variable $\Delta V_i$), the rotation rate fuzzy input variable $\Delta^2\Omega_i$ (the motor current variable $\Delta I_i$) and the torque fuzzy input variable $\Delta^2\tau_{p,i}$ of another fuzzy logic controller in FIG. 5.
Figure 13:
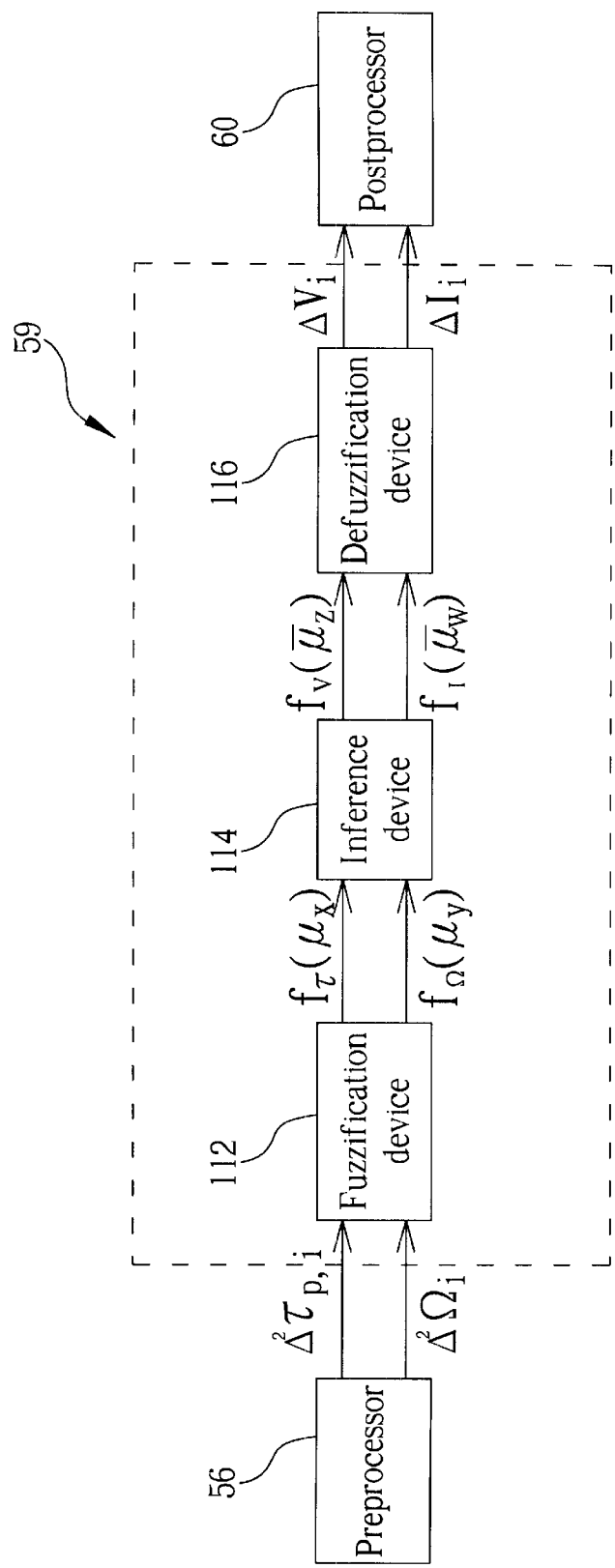
FIG. 13 is a functional block diagram of another fuzzy logic controller in FIG. 5.

Please refer to FIG. 8. FIG. 8 shows the relationship of the digital rotation rate signal $\Omega_i$, the rotation rate differential signal $\Delta\Omega_i$ (the motor voltage variable $\Delta V_i$), the rotation rate fuzzy input variable $\Delta^2\Omega_i$ (the motor current variable $\Delta I_i$) and the torque fuzzy input variable $\Delta^2\tau_{p,i}$ of the fuzzy logic controller 59 (FIG. 13). The fuzzy logic rules of the bicycle control system 30 are formed according to the physical features of the elebike 32 during acceleration. The concept of "parabolic blend" is used to approximate the curve of the digital rotation rate signal $\Omega_i$ of the elebike 32 during acceleration. As shown in graph (A) of FIG. 8, the curve of the digital rotation rate signal $\Omega_i$ is divided into three zones. The first zone (Zone 1) is approximated by a parabolic function. The second zone (Zone 2) is approximated by a linear function. The third zone (Zone 3) is approximated by a parabolic function. The first zone and the third zone of the curve of the digital rotation rate signal $\Omega_i$ are antisymmetrical with respect to the center A of the second zone. As shown in graph (B) of FIG. 8, the curve of the rotation rate differential signal $\Delta\Omega_i$ of the elebike 32 during acceleration is divided into four zones. They are positive-big (PB) zone, positive-medium (PM) zone, positive-small (PS) zone and zero (Z) zone. The rotation rate differential signal $\Delta\Omega_i$ can also physically represent the motor voltage variable $\Delta V_i$. As shown in graph (C) of FIG. 8, the curve of the rotation rate fuzzy input variable $\Delta^2\Omega_i$ of the elebike 32 during acceleration is divided into seven zones. They are PB zone, PM zone, PS zone, Z zone, negative-small (NS) zone, negative-medium (NM) zone and negative-big (NB) zone. The rotation rate fuzzy input variable $\Delta^2\Omega_i$ can also physically represent the motor current variable $\Delta I_i$. As shown in graph (D) of FIG. 8, the curve of the torque fuzzy input variable $\Delta^2\tau_{p,i}$ of the elebike 32 during acceleration is also divided into seven zones. They are PB zone, PM zone, PS zone, Z zone, NS zone, NM zone and NB zone.

Figures 8A, 8B:
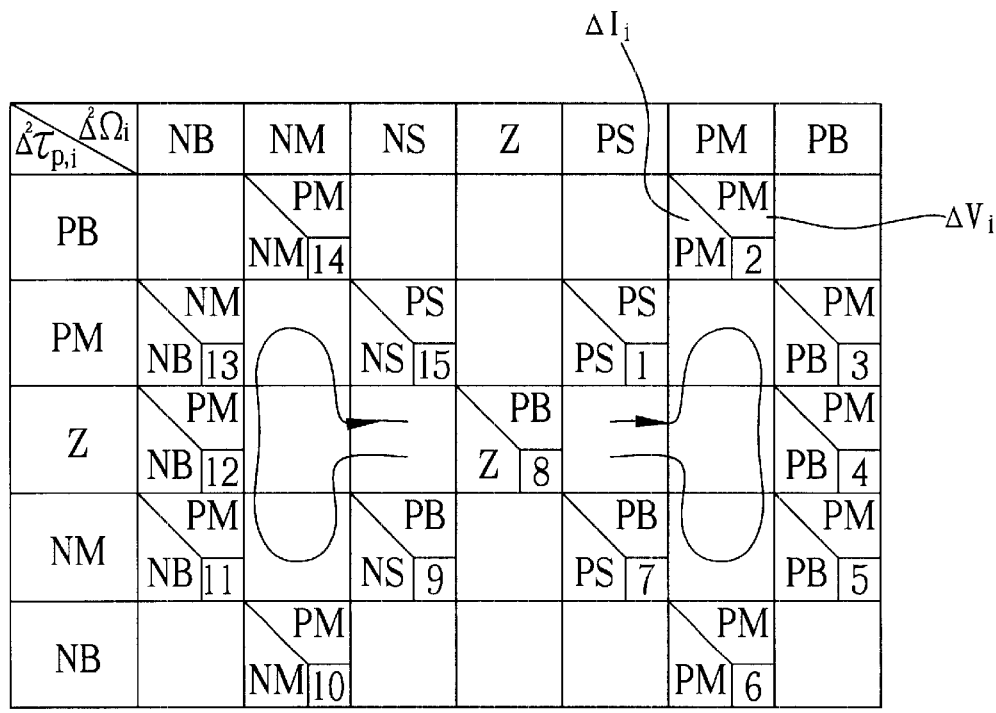
FIG. 8a is a table of the fuzzy logic rules of the fuzzy logic controller in FIG. 8.
FIG. 8b is a corresponding table of the fuzzy logic variables and linguistic terms.

Please refer to FIG. 8a. FIG. 8a is a table of the fuzzy logic rules of the fuzzy logic controller 59 in FIG. 13. The upper right corner of each square shows the zone of the motor voltage variable $\Delta V_i$, and the lower left corner of each square shows the zone of the motor current variable $\Delta I_i$. The lower right corner of each square shows the number of the fuzzy logic rule. The fuzzy logic rules are formed based upon a one-to-one relationship between the torque and rotation rate fuzzy input variables $\Delta^2\tau_{p,i}, \Delta^2\Omega_i$ and the motor voltage and current variables $\Delta V_i, \Delta I_i$. T represents the duration time of acceleration for the elebike 32. Please refer to FIG. 8. At T/8, according to line L1, the torque fuzzy input variables $\Delta^2\tau_{p,i}$ is in zone PB (graph D), the rotation rate fuzzy input variables $\Delta^2\Omega_i$ is in zone PM (graph C), the motor voltage variable $\Delta V_i$ is in zone PM (graph B) and the motor current variable $\Delta I_i$ is in zone PM (graph C). In this manner, based upon the graphs in FIG. 8, if-then relationships between $\Delta^2\tau_{p,i}, \Delta^2\Omega_I$ and $\Delta V_i, \Delta I_i$ can be formed. These rules are tabulated in FIG. 8a. For example, if $\Delta^2\tau_{p,i}$ is PB and $\Delta^2\Omega_i$ is PM, then $\Delta V_i$ is PM. This is the second voltage fuzzy logic rule ($R_V2$) as shown in FIG. 8a. If $\Delta^2\tau_{p,i}$ is PB and $\Delta^2\Omega_i$ is PM, then $\Delta I_i$ is also PM. This is the second current fuzzy logic rule ($R_I2$) as shown in FIG. 8a. By partitioning the T axis into 16 subsets (T/16, T/8, 3T/16, T/4, . . . , 15T/16, T), the fifteen voltage fuzzy logic rules ($R_V1$~$R_V15$) and fifteen current fuzzy logic rules ($R_I1$~$R_I15$) are formed as shown in FIG. 8a. The bicycle control system 30 activates the electrical power assist when the bicycle speed, from pedaling, exceeds 3.5 Km/hr.

Design of Membership Functions

Please refer to FIG. 8b. FIG. 8b is a table of the fuzzy logic variables and their linguistic terms. The fuzzy logic variables of the alternative fuzzy logic controller 59 of the bicycle control system 30 include the torque fuzzy input variable $\Delta^2\tau_{p,i}$, the rotation rate fuzzy input variable $\Delta^2\Omega_i$, the motor voltage variable $\Delta V_i$, and motor current variable $\Delta I_i$. The torque fuzzy input variable $\Delta^2\tau_{p,i}$, rotation rate fuzzy input variable $\Delta^2\Omega_i$, and motor current variables $\Delta I_i$ have seven linguistic terms which are PB, PM, PS, Z, NS, NM, and NB. The motor voltage variable $\Delta V_i$ has four linguistic terms which are PB, PM, PS, and Z. The membership function of each linguistic term is defined by trigonometric functions.

Figure 9:
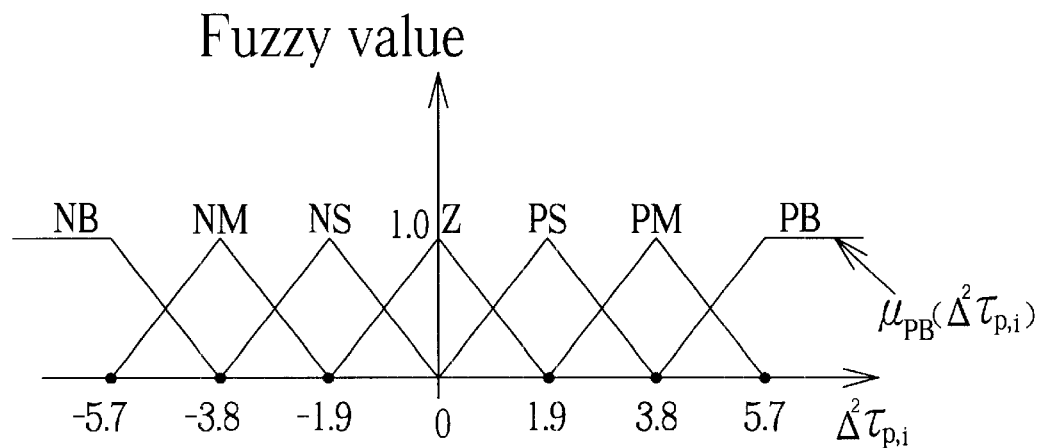
FIG. 9 is a diagram of the torque input membership function $\mu$ ($\Delta^2\tau_{p,i}$) complied with FIG. 8.
Figure 10:
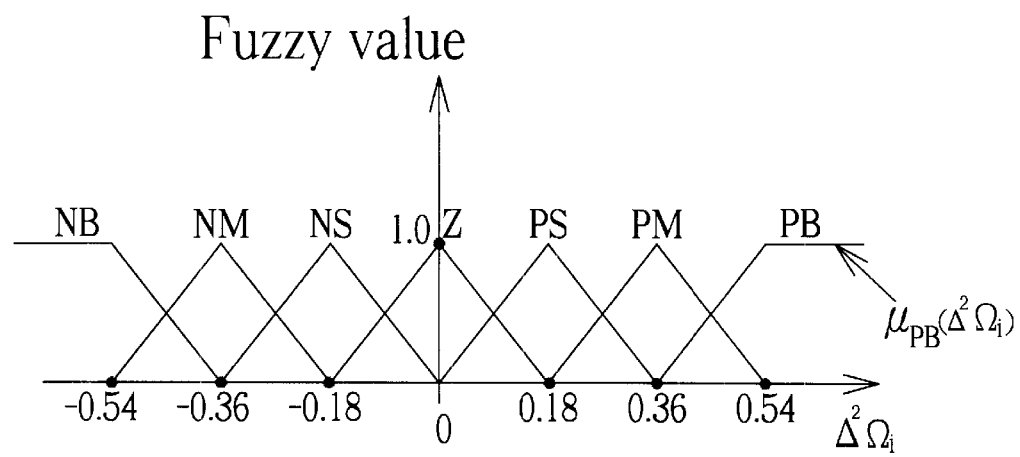
FIG. 10 is a diagram of the rotation rate input membership function $\mu$ ($\Delta^2\Omega_i$) complied with FIG. 8.
Figure 11:
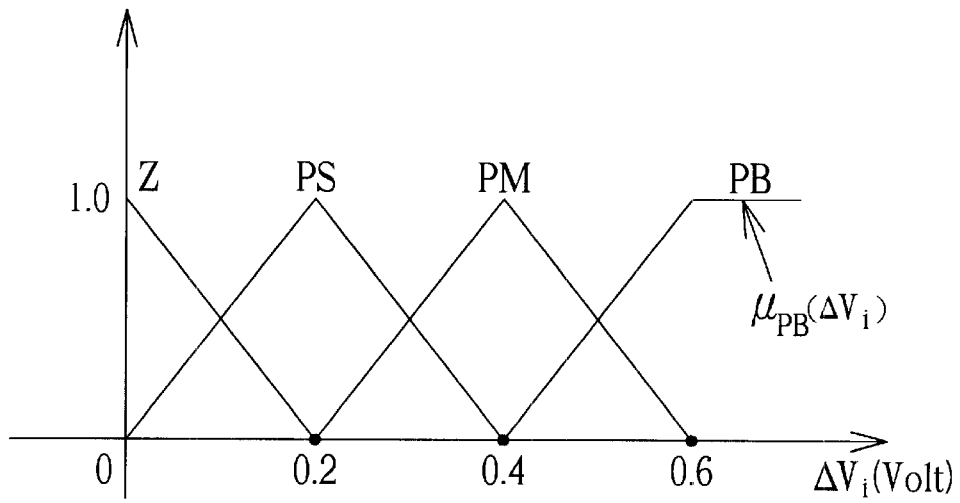
FIG. 11 is a diagram of the voltage output membership function $\mu$ ($\Delta V_i$) complied with FIG. 8.
Figure 12:
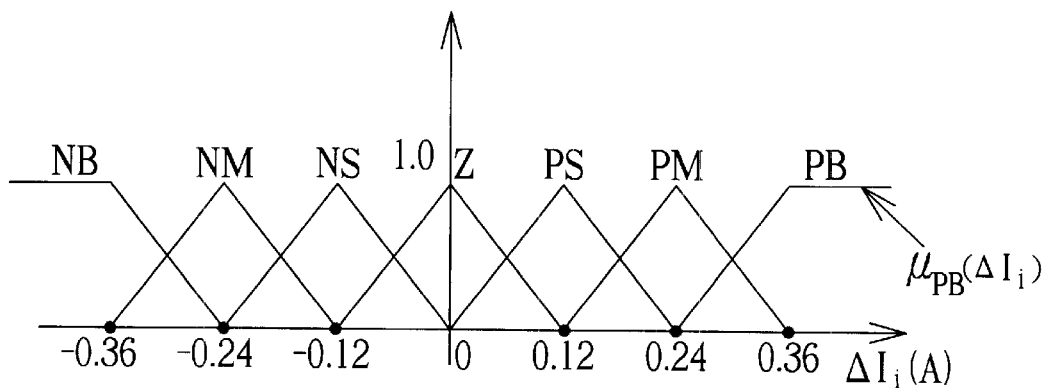
FIG. 12 is a diagram of the current output membership function $\mu$ ($\Delta I_i$) complied with FIG. 8.

Please refer to FIG. 9 to FIG. 12. FIG. 9 is a diagram of the torque input membership function $\mu$ ($\Delta^2\tau_{p,i}$) complied with FIG. 8. FIG. 10 is a diagram of the rotation rate input membership function $\mu$ ($\Delta^2\Omega_i$) complied with FIG. 8. FIG. 11 is a diagram of the voltage output membership function $\mu$ ($\Delta V_i$) complied with FIG. 8. FIG. 12 is a diagram of the current output membership function $\mu$ ($\Delta I_i$) complied with FIG. 8. The membership functions of the fuzzy logic controller 59 as shown in FIG. 13 are designed according to the following conditions:

The maximum speed V of the elebike 32, V=36 km/hr=10 m/s

The friction of the elebike 32, Fr=24.5N

The mass M of the elebike 32, M=35 kg

The radius R of the wheel 35, 36, R=0.3 m

The number $N_1$ of teeth of the first gear wheel 37 of the transmission mechanism 38, $N_1$=44

The number $N_2$ of teeth of the second gear wheel 39 of the transmission mechanism 38, $N_2$=19

The time T required for accelerating the elebike 32 up to the maximum speed V, T=5s The maximum output voltage $V_{max}$ of the servo motor 42, $V_{max}$=24 Volt The control rate $f_c$ of the control circuit 52, $f_c$=4 Hz According to the mentioned conditions, the membership functions of the fuzzy logic controller 59 of the bicycle control system 30 is designed as follows:

The power $P_r$ required by the elebike 32 to accelerate to the highest speed V, $$P_r = Fr \times V = 24.5 \times 10 = 245(W)$$

The inertial force $F_I$ required by the elebike 32 during the acceleration, $$F_I = M \times (V/T) = 35 \times (10/5) = 70(N)$$

The power $P_I$ required by the elebike 32 during the acceleration, $P_f=F_f\times(V/2)=70\times(10/2)=350(W)$ Since $P_f>P_r$,
the maximum output power $P_{max}$ of the servo motor 42 is 350W, $P_{max}=P_f=350\ (W)$ And the maximum output current $I_{max}$ of the servo motor 42 is:

$I_{max}=P_{max}/V_{max}=350/24\approx14.6(A)$

Furthermore, the maximum torque $\tau_{p(max)}$ required by the elebike 32 during acceleration is:

$\tau_{p(max)}=(N_1/N_2)(P_{max}/\Omega)$ wherein $\Omega$ is the average rotation rate of the elebike 32 during the period of acceleration. The maximum output power $P_{max}$ of the servo motor 42 is generated at the mid-point A of the second zone (Z2) of the curve of the digital rotation rate signal $\Omega_i$, shown in graph (A) of FIG. 8. The average rotation rate $\Omega$ is $(V/2)/R$, and $\tau_{p(max)}$ is:

$\tau_{p(max)}=(N_1/N_2)(P_{max}/(V/2)/R)=(44/19)(350/(10/2)/0.3)\approx44.23(N\cdot m)$ Based on the parabolic blend engineering approximation, the derivative $\dot{\tau}_{p(max)}$ of the maximum torque $\tau_{p(max)}$ with respect to time is:

$\dot{\tau}_{p(max)}=\tau_{p(max)}/(T/2)=44.23/(5/2)\approx17.7(N\cdot m/s)$ and the second derivative $\ddot{\tau}_{p(max)}$ of the maximum torque $\tau_{p(max)}$ with respect to time is:

$\ddot{\tau}_{p(max)}=\dot{\tau}_{p(max)}/(T/4)=17.7/(5/4)\approx14.2(N\cdot m/s^2)$ The maximum torque fuzzy input variable $\Delta^2\tau_{p,i(max)}$ is:

$\Delta^2\tau_{p,i(max)}=\ddot{\tau}_{p(max)}/(f_c\times T/8)=14.2/(4\times5/8)\approx5.7$ The torque input membership function $\mu(\Delta^2\tau_{p,i})$ of the fuzzy logic controller 59 is shown in FIG. 9.

The maximum rotation rate $\Omega_{(max)}$ of the elebike 32 during the accelerating period (T) is:

$\Omega_{(max)}=V/R=10/0.3\approx33.3\ (rad/s)$

The derivative $\dot{\Omega}_{(max)}$ of the maximum rotation rate $\Omega_{(max)}$ with respect to time is:

$\dot{\Omega}_{(max)}=\Omega_{(max)}/T=33.3/5\approx6.7(rad/s^2)$ and the second derivative $\ddot{\Omega}_{(max)}$ of the maximum rotation rate $\Omega_{(max)}$ with respect to time is:

$\ddot{\Omega}_{(max)}=\dot{\Omega}_{(max)}/(T/2)=6.7/(5/2)\approx2.7(radm/s^3)$ The maximum rotation rate fuzzy input variable $\Delta^2\Omega_{i(max)}$ is:

$\Delta^2\Omega_{i(max)}=\ddot{\Omega}_{(max)}/(f_c\times T/4)=2.7/(4\times5/4)\approx0.54$ The rotation rate input membership function $\mu(\Delta^2\Omega_i)$ of the fuzzy logic controller 59 is shown in FIG. 10.

The peak voltage of the pulse width modulator 33 is $\pm12$(Volt), and the maximum input voltage to the pulse width modulator 33 is 12(Volt).

As shown in FIG. 3, the input voltage to the pulse width modulator 33 is the coupling voltage $V_c$, $V_c=S_L\times V_{f,i}+S_T\times V_H$ Wherein $0\leq S_L\leq1$ $0\leq S_T\leq1$ $S_L+S_T=1$ When finished training the fuzzy logic controller 59, $S_L=1$ and $S_T=0$, $V_c=V_{f,i}=[W_V(V_i/V_N)+W_I(I_i/I_N)]V_N$ Wherein $W_V=0.7$, $W_I=1.3$ ($W_V$ and $W_I$ can be changed according to conditions), $V_N=24/2=12(Volt)$, $I_N=14.6/2=7.3(A)$ and $V_c=12[0.7(V_i/12)+0.3(I_i/7.3)]$ The maximum motor voltage variable $\Delta V_{i(max)}$ of the elebike 32 during the period of acceleration (T) is:

$\Delta V_{i(max)}=V_N/(f_c T)=12/(4\times5)=0.6(Volts)$

The voltage output membership function $\mu(\Delta V_i)$ of the fuzzy logic controller 59 is shown in FIG. 11.

The maximum motor current variable $\Delta I_{i(max)}$ of the elebike 32 during the period of acceleration (T) is:

$\Delta I_{i(max)}=I_N/(f_c T)=7.3/(4\times5)\approx0.36(A)$

The current output membership function $\mu(\Delta I_i)$ of the fuzzy logic controller 59 is shown in FIG. 12.

Design of the Fuzzy Logic Controller

Please refer to FIG. 13. FIG. 13 is a functional block diagram of the fuzzy logic controller 59. The design of the fuzzy logic controller 59 based upon fuzzy logic rules and membership functions. The fuzzy logic controller 59 comprises a fuzzification device 112 connected to the preprocessor 56 for performing a fuzzy procedure so as to generate a torque fuzzy value $f_{96}$ ($\mu_x$) and a rotation rate fuzzy value $f_\Omega(\mu_y)$ An inference device 114 connected to the fuzzification device 112 performs a fuzzy inference procedure and generates a voltage fuzzy value $f_V(\mu_z)$ and a current fuzzy value $f_I(\mu_w)$ according to fifteen fuzzy logic rules wherein $x\in S_7$, $y\in S_7$, $w\in S_7$, $z\in S_4$, $S_7=\{PB,PM,PS,Z,NS,NM,NB\}$, $S_4=\{PB,PM,PS,Z\}$, and $\overline{\mu_z},\overline{\mu_w}$ are membership functions intercepted by the minimum fuzzy value of the torque fuzzy input variable $\Delta^2\tau_{p,i}$ and the rotation rate fuzzy input variable $\Delta^2\Omega_i$. A defuzzification device 116 is connected to the inference device 114 to perform a defuzzification procedure, outputting the motor voltage variable $\Delta V_i$ and the motor current variable $\Delta I_i$ to the postprocessor 60.

Figures 14, 14A, 14B:
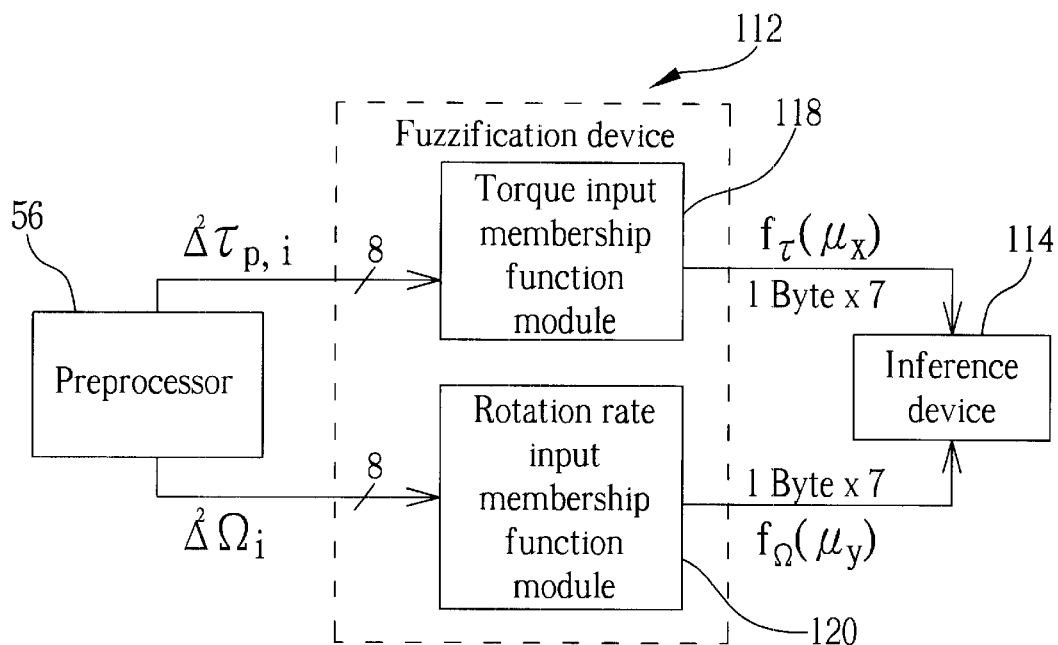
FIG. 14 is a diagram of the fuzzification device of the fuzzy logic controller in FIG. 13.
FIG. 14a is a table of the torque input membership function of the fuzzification device in FIG. 14.
FIG. 14b is a table of the rotation rate input membership function of the fuzzification device in FIG. 14.

Please refer to FIG. 14, FIG. 14a and FIG. 14b. FIG. 14 is a diagram of the fuzzification device 112 of the fuzzy logic controller 59 in FIG. 13. FIG. 14a is a table of the torque input membership function of the fuzzification device 112 in FIG. 14. FIG. 14b is a table of the rotation rate input membership function of the fuzzification device 112 in FIG. 14. The fuzzification device 112 is connected to the preprocessor 56 to transform the torque fuzzy input variable $\Delta^2\tau_{p,i}$ into a torque fuzzy value $f_{96}$ ($\mu_x$) according to the torque input membership function module 118. Similarly, the rotation rate fuzzy input variable $\Delta^2\Omega_i$ is transformed into a rotation rate fuzzy value $f_\Omega(\mu_y)$ according to the rotation rate input membership function module 120. The design of the torque input membership function module 118 is based upon the torque input membership function $\mu(\Delta^2\tau_{p,i})$ of the fuzzy logic controller 59. As shown in FIG. 9, the range of the torque fuzzy input variable $\Delta^2\tau_{p,i}$ is from 0 to 5.7 and it is partitioned into 64 fuzzy subsets. The range of the torque input membership function $\mu\,(\Delta^2\tau_{p,i})$ is from 0 to 1 and it is also partitioned into 64 fuzzy subsets. As shown in FIG. 14a, the fuzzy value of each linguistic term (PB, PM, PS, Z, NS, NM, NB) is written in a 1 kilobyte erasable and programmable read only memory (EPROM). The design of the rotation rate input membership function module 120 is based upon the rotation rate input membership functions $\mu\,(\Delta^2\Omega_i)$ of the fuzzy logic controller 59. As shown in FIG. 10, the range of the rotation rate fuzzy input variable $\Delta^2\Omega_i$ is from 0 to 0.54 and it is partitioned into 64 fuzzy subsets. The range of the rotation rate input membership functions $\mu\,(\Delta^2\Omega_i)$ is from 0 to 1 and it is also partitioned into 64 fuzzy subsets. As shown in FIG. 14b, the fuzzy value of each linguistic term (PB, PM, PS, Z, NS, NM, NB) is written in a 1 kilobyte erasable and programmable read only memory (EPROM). The torque input membership function module 118 and the rotation rate input membership function module 120 only show the positive portions of both the torque fuzzy input variable $\Delta^2\tau_{p,i}$ and the rotation rate fuzzy input variable $\Delta^2\Omega_i$.

Please refer to FIG. 15 and FIG. 15a. FIG. 15 is a diagram of the inference device 114 of the fuzzy logic controller 59 in FIG. 13. FIG. 15a is a table of the voltage output membership function of the inference device 114 in FIG. 15. The inference device 114 is connected to the fuzzification device 112 to transform the torque fuzzy value $f_\tau(\mu_x)$ and rotation rate fuzzy value $f_\Omega(\mu_y)$ into the motor voltage fuzzy value $f_V(\overline{\mu_z})$ according to the fifteen voltage fuzzy logic rules ($R_V1\sim R_V15$) and a voltage output membership function module. The inference device 114 also transforms the torque fuzzy value $f_\tau(\mu_x)$ and rotation rate fuzzy value $f_\Omega(\mu_y)$ into the motor current fuzzy value $f_I(\overline{\mu_w})$ (not shown) according to the fifteen current fuzzy logic rules ($R_I1\sim R_I15$) and a current output membership function module. The inference device 114 is designed around the second voltage fuzzy logic rule $R_V2$. The torque fuzzy input variable $\Delta^2\tau_{p,i}$ is 5.7 and the rotation rate fuzzy input variable $\Delta^2\Omega_i$ is 0.27. The voltage output membership function module is designed according to the voltage output membership function $\mu\,(\Delta V_i)$ of the fuzzy logic controller 59. As shown in FIG. 11, the range of the rotation rate fuzzy input variable $\Delta^2\Omega_i$ is from 0 to 0.54 and it is partitioned into 64 fuzzy subsets. The range of the motor voltage variable $\Delta V_i$ is from 0 to 0.6 and the range of the voltage output membership function $\mu\,(\Delta V_i)$ is from 0 to 1, and they are partitioned into 64 fuzzy subsets. As shown in FIG. 15a, the fuzzy value of each linguistic term (PB, PM, PS, Z) is written in a 1 kilobyte erasable and programmable read only memory (EPROM).

Please refer to FIG. 16. FIG. 16 is a diagram of the defuzzification device 116 of the fuzzy logic controller 59 in FIG. 13. The defuzzification device 116 is connected to the inference device 114 for transforming the motor voltage fuzzy value $f_V(\overline{\mu_z})$ and the motor current fuzzy value $f_I(\overline{\mu_w})$ into the motor voltage variable $\Delta V_i$ and the motor current variable $\Delta I_i$. The defuzzification device 116 is designed for the defuzzification procedure of the motor voltage fuzzy value $f_V(\overline{\mu_z})$. The defuzzification device 116 performs the defuzzification according to the motor voltage fuzzy value $f_V(\overline{\mu_z})$ to generate the motor voltage variable $\Delta V_i$.

When the preprocessor 56 of the control circuit 52 generates the torque fuzzy input variable $\Delta^2\tau_{p,i}$ and the rotation rate fuzzy input variable $\Delta^2\Omega_i$, the fuzzy logic controller 59 transforms the torque fuzzy input variable $\Delta^2\tau_{p,i}$ and the rotation rate fuzzy input variable $\Delta^2\Omega_i$ into the motor voltage variable $\Delta V_i$ and the motor current variable $\Delta I_i$.

Compared with the prior art elebike 10, the voltage and current fuzzy logic rules of the fuzzy logic controller 58, 59 of the bicycle control system 30 are based upon the physical features of the elebike 32 during acceleration. The torque input membership function $\mu\,(\Delta^2\tau_{p,i})$, the rotation rate input membership function $\mu\,(\Delta^2\Omega_i)$, the voltage output membership function $\mu\,(\Delta V_i)$ and the current output membership function $\mu\,(\Delta I_i)$ of the fuzzy logic controller 58, 59 are designed around the operating features of the elebike 32. When the rider controls the elebike 32, the bicycle control system 30 generates the coupling voltage $V_c$ according to fuzzy logic rules. The pulse width modulator 33 modulates the pulse width of the coupling voltage $V_c$ and generates a pulse width voltage $V_f$. Then the amplifier 37 amplifies the pulse width voltage $V_f$ and generates an amplified voltage $V_a$ to control the torque $\tau_{e,i}$ generated by the servo motor 42. Finally, the coupling device 44 couples the torque $\tau_{e,i}$ of the servo motor 42 to the transmission mechanism 38 to actuate the wheel 36 so as to control the electrical power assisting the elebike 32.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A bicycle control system for controlling an elebike (electrical power-aided bicycle) according to a rider's inputs, the elebike comprising:

a bicycle frame;

at least one wheel rotatably installed on the frame;

a transmission mechanism installed on the frame for actuating the wheel;

a pedal mechanism installed on the frame for transforming pedal forces inputted by the rider into pedal torque and coupling the torque to the transmission mechanism to actuate the wheel;

a servo motor installed on the frame and comprising a control port, wherein the servo motor is used for outputting a torque according to an input voltage inputted from the control port;

a coupling device installed on the frame for coupling the torque outputted from the servo motor to the transmission mechanism to actuate the wheel; and a power control handle installed on the frame and connected the control port of the servo motor for outputting a handle voltage according to the rider's inputs to control the torque outputted by the servo motor;

the bicycle control system comprising:

a torque detector for detecting the pedal torque inputted by the rider and outputting a torque signal;

a rotation rate detector for detecting the rotation rate of the wheel and outputting a rotation rate signal;

a control circuit for processing the torque signal outputted by the torque detector and the rotation rate signal outputted by the rotation rate detector and outputting a motor control voltage; and a voltage coupling device connected with the handle, the output port of the control circuit and the control port of the servo motor for coupling the handle voltage outputted from the handle with the motor control voltage outputted from the control circuit in a predetermined manner and outputting a coupling voltage to control the servo motor.

2. The bicycle control system of claim 1 wherein the control circuit comprises:

a preprocessor for processing the torque signal outputted from the torque detector and rotation rate signal outputted from the rotation rate detector and generating a plurality of fuzzy input variables;

a fuzzy logic controller for transforming the fuzzy input variables into a plurality of fuzzy output variables according to a plurality of fuzzy logic rules; and a postprocessor for transforming the fuzzy output variables into a motor control voltage.

3. The bicycle control system of claim 2 wherein the fuzzy output variables generated by the fuzzy logic controller comprise a motor voltage variable and a motor current variable, and the postprocessor transforms the motor voltage variable and the motor current variable outputted from the fuzzy logic controller into the motor control voltage in a predetermined manner.

4. The bicycle control system of claim 3 further comprising a current detector for detecting the current of the servo motor and outputting a current, wherein the postprocessor combines the motor voltage variable outputted by the fuzzy logic controller and the coupling voltage outputted by the voltage coupling device in a predetermined manner to generate a voltage controlling variable, and combines the motor current variable outputted by the fuzzy logic controller with the current outputted by the current detector in a predetermined manner to generate a current controlling variable, and then combines the voltage controlling variable and the current controlling variable in a predetermined manner to generate the motor control voltage.

5. The bicycle control system of claim 4 wherein the preprocessor comprises a first analog/digital converter for transforming the torque signal generated by the torque detector into a digital torque signal, and a second analog/digital converter for transforming the rotation rate signal outputted by the rotation rate detector into a digital rotation rate signal, and the preprocessor generates a torque fuzzy input variable and a rotation rate fuzzy input variable according to the digital torque signal and digital rotation rate signal.

6. The bicycle control system of claim 5 wherein the preprocessor comprises:

a first torque signal delay circuit connected to the first analog/digital converter for delaying the digital torque signal for a time unit and generating a first torque delaying signal;

a second torque signal delay circuit connected to the first torque signal delay circuit for delaying the first torque delaying signal for a time unit and generating a second torque delaying signal;

a first rotation rate signal delay circuit connected to the second analog/digital converter for delaying the digital rotation rate signal for a time unit and generating a first rotation rate delaying signal;

a second rotation rate signal delay circuit connected to the first rotation rate signal delay circuit for delaying the first rotation rate delaying signal for a time unit and generating a second rotation rate delaying signal; and a differential device connected to the first analog/digital converter, the second analog/digital converter, the first torque signal delay circuit, the second torque signal delay circuit, the first rotation rate signal delay circuit, and the second rotation rate signal delay circuit for generating the torque fuzzy input variable and the rotation rate fuzzy input variable;

wherein the differential device generates a first torque differential signal by computing the difference between the first torque delaying signal and the digital torque signal, generating a second torque differential signal by computing the difference between the second torque delaying signal and the first torque delaying signal, generating a torque fuzzy input variable by computing the difference between the second torque differential signal and the first torque differential signal, and the differential device generates a first rotation rate differential signal by computing the difference between the first rotation rate delaying signal and the digital rotation rate signal, generating a second rotation rate differential signal by computing the difference between the second rotation rate delaying signal and the first rotation rate delaying signal, generating a rotation rate fuzzy input variable by computing the difference between the second rotation rate differential signal and the first rotation rate differential signal, and the fuzzy logic controller transforms the torque and rotation rate fuzzy input variables into the motor voltage variable and the motor current variable according to a plurality of fuzzy logic rules.

7. The bicycle control system of claim 6 wherein the fuzzy logic controller comprises a memory for storing the fuzzy logic rules, a fuzzy control unit connected to the preprocessor for transforming the torque and rotation rate fuzzy input variables into the motor voltage variable and the motor current variable according to the fuzzy logic rules.

8. The bicycle control system of claim 7 wherein the fuzzy logic rules comprises a plurality of voltage fuzzy logic rules and a plurality of current fuzzy logic rules, each of the voltage fuzzy logic rules defines a relationship between the torque and rotation rate fuzzy input variables and the motor voltage variable, and each of the current fuzzy logic rules defines a relationship between the torque and rotation rate fuzzy input variables and the motor current variable.

9. The bicycle control system of claim 7 wherein the fuzzy logic controller further comprises a torque input membership function module stored in the memory for transforming the torque fuzzy input variable into a torque fuzzy value, a rotation rate input membership function module stored in the memory for transforming the rotation rate fuzzy input variable into a rotation rate fuzzy value, a voltage output membership function module stored in the memory for transforming the voltage fuzzy output variable into a voltage fuzzy value, and a current output membership function module stored in the memory for transforming the current fuzzy output variable into a current fuzzy value.

10. The bicycle control system of claim 4 wherein the postprocessor comprises a third analog/digital converter for transforming the coupling voltage outputted by the voltage coupling device into a digital voltage signal, and a fourth analog/digital converter for transforming the current outputted by the current detector into a digital current signal, and the postprocessor outputs the motor control voltage according to the digital voltage signal and the digital current signal.

11. The bicycle control system of claim 10 wherein the postprocessor comprises:

a voltage signal delay circuit connected to the third analog/digital converter for delaying the digital voltage signal for a time unit and generating a voltage delaying signal;

a current signal delay circuit connected to the fourth analog/digital converter for delaying the digital current signal for a time unit and generating a current delaying signal;

a first adder for processing the voltage delaying signal and the motor voltage variable generated by the fuzzy logic controller to generate an output voltage variable;

a second adder for processing the current delaying signal and the motor current variable generated by the fuzzy logic controller to generate an output current variable;

a first multiplier for multiplying the output voltage variable generated by the first adder by a predetermined voltage correcting value to generate a voltage correcting value;

a second multiplier for multiplying the output current variable generated by the second adder by a predetermined current correcting value to generate a current correcting value;

a third adder for adding the voltage correcting value generated by the first adder and the current correcting value generated by the second adder to generate a sum correcting value; and a third multiplier for multiplying the sum correcting value generated by the third adder by a predetermined voltage parameter to generate the motor control voltage.

12. The bicycle control system of claim 1 wherein the voltage coupling device comprises:

a fourth multiplier for multiplying the motor control voltage outputted by the control circuit by a predetermined first control parameter to generate a first motor control voltage;

a fifth multiplier for multiplying the handle voltage outputted by the handle by a predetermined second control parameter to generate a second motor control voltage; and a fourth adder for adding the first motor control voltage generated by the fourth multiplier and the second motor control voltage generated by the fifth multiplier to output the coupling voltage.

13. The bicycle control system of claim 12 wherein the sum of the first and second control parameters is 1.

14. The bicycle control system of claim 1 wherein the elebike further comprises a pulse width modulator connected to the output port of the voltage coupling device for modulating the pulse width of the coupling voltage and generating a pulse width voltage, and an amplifier connected between the output port of the pulse width modulator and the control port of the servo motor for amplifying the pulse width voltage and generating an amplified voltage to drive the servo motor.

* * * * *